(12) United States Patent
Vervaet

(10) Patent No.: US 7,628,880 B2
(45) Date of Patent: Dec. 8, 2009

(54) METHOD OF MOUNTING TIRES TO CIVIL ENGINEERING VEHICLES AND ASSOCIATED TIRE

(75) Inventor: Patrick Vervaet, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 552 days.

(21) Appl. No.: 11/225,439

(22) Filed: Sep. 13, 2005

(65) Prior Publication Data
US 2006/0037684 A1 Feb. 23, 2006

Related U.S. Application Data

(63) Continuation of application No. PCT/EP2004/002624, filed on Mar. 12, 2004.

(30) Foreign Application Priority Data

Mar. 25, 2003 (FR) ................................. 03 03676

(51) Int. Cl.
B29D 30/00 (2006.01)
B60C 11/13 (2006.01)

(52) U.S. Cl. ................. 156/110.1; 29/428; 152/209.24; 152/904

(58) Field of Classification Search ............. 156/110.1; 29/428; 152/209.24, 904
See application file for complete search history.

(56) References Cited

U.S. PATENT DOCUMENTS

| | | | |
|---|---|---|---|
| 1,078,098 A * | 11/1913 | Kremer | 152/209.28 |
| 3,909,906 A * | 10/1975 | MacMillan | 152/523 |
| 3,956,931 A * | 5/1976 | Grosch et al. | 73/146 |
| 4,284,115 A * | 8/1981 | Ohnishi | 152/209.24 |
| 4,832,099 A | 5/1989 | Matsumoto | |
| 5,044,414 A * | 9/1991 | Ushikubo | 152/209.24 |
| 5,127,455 A * | 7/1992 | Remick | 152/209.24 |
| 5,187,977 A * | 2/1993 | Koschorek et al. | 73/146 |

(Continued)

FOREIGN PATENT DOCUMENTS

DE 888 654 C 9/1953

(Continued)

Primary Examiner—Steven D Maki
(74) Attorney, Agent, or Firm—Cohen, Pontani, Lieberman & Pavane LLP

(57) ABSTRACT

A method for fitting tires (P) to a driving axle of a vehicle carrying heavy loads, which consists, after having determined the type of journey made by said vehicle, in:
when the route is of type A (ascending under load with a driving torque and descending empty with a braking torque), fitting to each driving axle tires such that for each transverse groove (31) in the edge portions (B) of the tread (1), the angle of inclination of the rubber faces (310, 311) delimiting the transverse grooves (31) which first come into ground contact is smaller than the angle of inclination of the rubber face opposite delimiting the same transverse groove, or
when the route is of type V (ascending empty and descending under load with a braking torque), fitting to each driving axle tires such that for each transverse groove (31) in the edge portions (B) of the tread, the angle of inclination of the rubber face (310, 311) delimiting said transverse groove which first comes into ground contact is larger than the angle of inclination of the rubber face opposite delimiting the same transverse groove.

A tire (P) appropriate for implementing the method described.

4 Claims, 2 Drawing Sheets

U.S. PATENT DOCUMENTS

| | | | |
|---|---|---|---|
| 5,200,008 A * | 4/1993 | Enterline et al. | 156/110.1 |
| 5,211,779 A * | 5/1993 | Tomioka et al. | 152/904 |
| 5,297,604 A | 3/1994 | Lurois | |
| 5,358,022 A | 10/1994 | Glover et al. | |
| 5,960,845 A * | 10/1999 | Wada | 152/209.23 |
| 2002/0170644 A1* | 11/2002 | Comps | 152/209.5 |
| 2006/0191616 A1* | 8/2006 | Canankamp et al. | 152/209.24 |

FOREIGN PATENT DOCUMENTS

| | | | |
|---|---|---|---|
| DE | 4319713 | * | 12/1994 |
| EP | 688685 | * | 12/1995 |
| EP | 0 734 887 A | | 10/1996 |
| EP | 1 026 012 A | | 8/2000 |
| JP | 04-100706 | * | 4/1992 |
| WO | WO 99/17943 | * | 4/1999 |

* cited by examiner

II-II

III-III

METHOD OF MOUNTING TIRES TO CIVIL ENGINEERING VEHICLES AND ASSOCIATED TIRE

This is a continuation of International Application PCT/EP2004/002624, with an international filing date of Mar. 12, 2004, now abandoned, claiming priority to French Patent Application No. 03/03676 filed Mar. 25, 2003.

FIELD OF INVENTION

The present invention relates to the field of tires for construction machinery and more particularly the tread patterns of such tires; the invention also concerns a method of fitting a dumper vehicle with tires that makes it possible, in accordance with the use of said vehicle, to reduce irregular wear phenomena.

BACKGROUND OF INVENTION

Construction vehicles are known which are designed to transport large amounts of ore in mines and which roll in severe conditions, in particular on steeply inclined slopes. Such vehicles, which are referred to as dumpers, are provided with one or more driving axles and a steering axle fitted with appropriately sized tires. It has been found that the wear of such tires is markedly affected by the slippage generated by the longitudinal reaction force exerted by the ground on the tire tread as a result of the torque involved in transporting large loads.

From FR 2382348 a tire of the type fitted to an agricultural tractor is known, which has on its tread a pattern formed of blocks in relief which extend over about half the width of said tread. The irregular wear that can occur on this type of tread pattern is reduced by the application of a technique consisting in the provision of leading and trailing faces having angles measured relative to a perpendicular to the rolling surface that vary progressively from the median part of the tread towards the edges; besides, the angle of the leading face decreases towards the edge of the tread while that of the trailing face increases.

That document essentially concerns tires for vehicles working on loose ground and which have to travel on roads from time to time; unlike the tires to which the present invention relates, these tires are not stressed under load conditions which are very large and very variable during their cycle of use, and besides the service pressures are generally low on loose ground so as not to give rise to undue packing down of such ground.

In the case of the invention presented here, the conditions of use are very different because tires for vehicles used only on sites of the type described are used for carrying very heavy loads which impose very large deformations on the tires and their tread. This use involves runs under heavy load alternating with runs under no load.

Besides, in some mines there are steep inclines which make the rolling conditions even more difficult.

It is necessary to distinguish two main types of use:

type A: the vehicle rolls under full load on an ascending slope and returns along the same route; in this type of use the tires on the driving axle are subjected to large driving torques on the way up and to braking torques on the return run (in this type of use the driving forces being larger than the braking forces);

type V: conversely to type A, the vehicle rolls under full load with a braking torque on a descending slope and returns up the same slope when empty (in this type of use the braking forces are larger than the driving forces).

By analogy, rolling cycles with and without load on flat or almost flat ground resemble type-A rolling, since the driving force predominates over the braking force owing to the rolling resistance of the tires.

An objective of the present invention is to find a way of determining the fitting of tires to construction machinery which is optimum from the standpoint of wear (i.e. which results in greater durability of said tires in service).

SUMMARY OF THE INVENTION

With this in mind, a method is proposed for fitting tires to each driving axle of a construction vehicle carrying heavy loads such that the life of said tires against wear is increased, this method consisting in:

choosing tires for said vehicle, these tires being provided with a tread of maximum width L an outer surface of which forms a rolling surface, the tread itself being provided with a pattern comprising a plurality of relief elements which delimit at least a plurality of grooves extending transversely, each transverse groove being delimited by a first face and a second face of rubber opposite one another, the tread comprising:

a median portion of width between 20 and 50% of the width L of the tread, this portion being able to be provided with grooves of substantially transverse orientation delimited by rubber faces having the same angle of inclination relative to a perpendicular to the rolling surface;

axially on either side of the median portion, edge portions each comprising a plurality of transverse grooves, each transverse groove being delimited by a first and a second rubber face, the first face being inclined relative to a perpendicular to the rolling surface with an angle different from the angle of inclination of the second face opposite it;

determining the type of journey made by said vehicle, namely either type A (i.e. ascending under load with a driving torque and descending empty with a braking torque), or type V (i.e. ascending empty and descending under load with a braking torque);

when the route is of type A, fitting to each driving axle tires such that for each transverse groove in the edge portions of the tread, the angle of inclination of the rubber face delimiting each transverse groove which first comes into ground contact is smaller than the angle of inclination of the rubber face opposite delimiting the same transverse groove, or when the route is of type V, fitting to each driving axle tires such that for each transverse groove in the edge portions of the tread, the angle of inclination of the rubber face delimiting said transverse groove which first comes into ground contact is larger than the angle of inclination of the rubber face opposite delimiting the same transverse groove.

In effect, the load supported by the edge of the tread—i.e. the axially external part—produces a longitudinal force because of the inclination angle difference between the faces first to come into ground contact and those last to emerge therefrom, this force being directed along the fitting directions prescribed above and being subtracted from the longitudinal force produced by the driving torque transmitted by the axle on which the tire is fitted in the loaded part of the cycle, so that slippage and consequently wear are reduced. In the unloaded part of the cycle, since the stress on the edges is low, the effect of this angle difference, although it still generates a longitudinal force that adds to the force giving rise to slippage, is small.

Thus, thanks to this method the wear-resisting life of a construction-vehicle tire whose wear pattern reveals that it is more particularly used on a route of one type rather than another (either type A or type V as defined earlier) can be optimized; this is generally the case in mines where the work involves extracting an ore from a given vein and dumping it at its storage site.

Thanks to the method according to the invention, the part of the tread axially furthest away from the equatorial plane is adapted to the alternating cycles with very low load and those with very large loads.

In addition, a tread is proposed for a tire fitted to a construction vehicle that carries heavy loads, this tread having maximum width L and comprising an outer surface which constitutes the rolling surface on which is formed a tread pattern comprising a plurality of relief elements that delimit at least a plurality of transversely orientated grooves, such transverse groove being delimited by a first and a second rubber face opposite one another, said tread comprising:

a median portion of width between 20 and 50% of the width L of the tread;

axially on either side of the median portion, edge portions each comprising a plurality of transverse grooves, each transverse groove being delimited by a first and a second rubber face, the first face inclined relative to a perpendicular to the rolling surface at an angle different from the angle of inclination of the second face opposite it.

In another variant of a tire tread according to the invention having the characteristics described above, the median portion is provided with grooves of substantially transverse orientation delimited by first and second rubber faces whose difference of inclination relative to a perpendicular to the rolling surface is smaller than the difference of inclination between the first and second rubber faces that delimit the transverse grooves at the edges of said tread.

Preferably, the difference of inclination between the first and second rubber faces that delimit the grooves at the edges of the tread is between 5° and 30°.

A value smaller than 5° does not produce a sufficiently perceptible improvement, while a value large than 30° results in groove areas very substantially larger than in the usual solutions and therefore leads to too large a reduction of material to be used and thus inevitably to an insufficient wear-resistance life.

Advantageously, the average angle of the first faces is between 6° and 12° and the average angle of the second faces is between 15° and 35°.

These angles are measured between said faces and a perpendicular to the rolling surface.

Values which are too small can result in compaction of the pattern elements under large load; a value larger than 35° entails groove areas very considerably larger than the usual solutions and leads to too large a reduction of the material to be used and thus inevitably to an insufficient wear resistance life.

The invention also concerns a construction vehicle having at least one driving axle fitted with tires, each tire on said axle having a tread having maximum width L and comprising an outer surface which constitutes the rolling surface on which is formed a tread pattern comprising a plurality of relief elements that delimit at least a plurality of transversely orientated grooves, such transverse groove being delimited by a first and a second rubber face opposite one another, said tread comprising:

a median portion of width between 20 and 50% of the width L of the tread;

axially on either side of the median portion, edge portions each comprising a plurality of transverse grooves, each transverse groove being delimited by a first and a second rubber face, the first face inclined relative to a perpendicular to the rolling surface at an angle different from the angle of inclination of the second face opposite it.

Other characteristics and advantages of the invention emerge from the description given below with reference to the attached drawings which show, as non-limiting examples, embodiments of the object of the invention.

DESCRIPTION OF THE PREFERRED EMBODIMENTS

Figure 1:
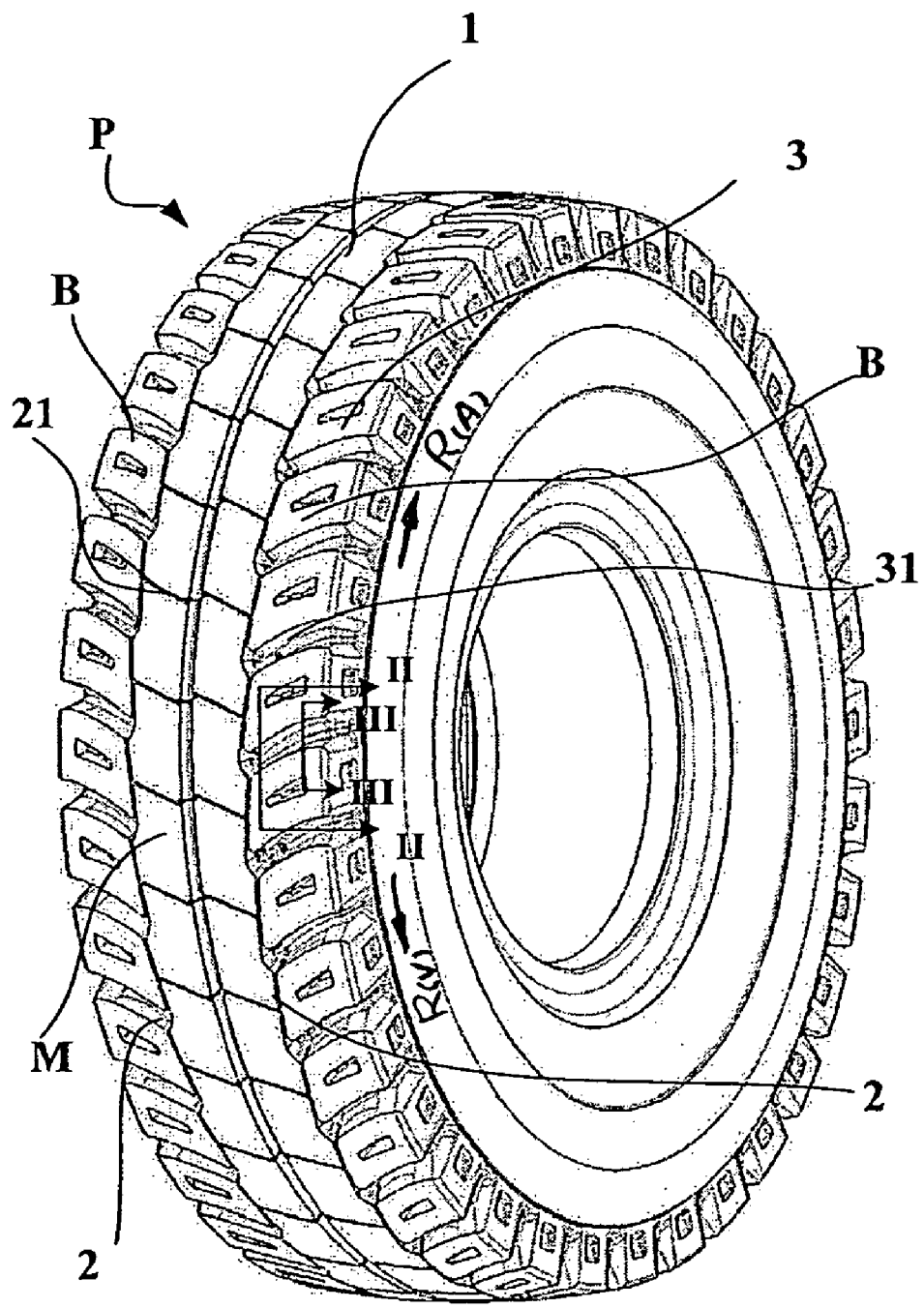
FIG. 1 shows a plan view of an example of a tread pattern according to the invention.

FIG. 1 shows a perspective view of a tire P according to the invention designed for fitting to a driving axle of a construction vehicle of the dumper type. This tire, of size 40.00 R 57, has a tread 1 of width L (equal to 970 mm) provided with a pattern that divides said tread axially (i.e. in the direction of its width) into three portions:

a median portion M extending between two grooves 2 of substantially circumferential orientation, this median portion M having a width equal to 410 mm (or 42% of L);

two portions B forming the edges of the tread on either side of the median portion M.

The median portion M has a plurality of grooves 21 with substantially transverse orientation; each of these grooves 21 is delimited by rubber faces that in the present case have zero inclination relative to a perpendicular to the rolling surface.

Each edge portion B is formed of a plurality of rubber blocks 3 spaced apart in the circumferential direction by grooves 31 with substantially transverse orientation (i.e. making an angle smaller than 45° with the axial direction of the tire corresponding to the tread width). Each transverse groove 31 is delimited by rubber faces opposite one another which, depending on the rolling direction adopted, are either leading faces (i.e. the faces first to come into contact with the ground during rolling) or trailing faces (i.e. those being last to break contact with the ground during rolling).

Figure 2:
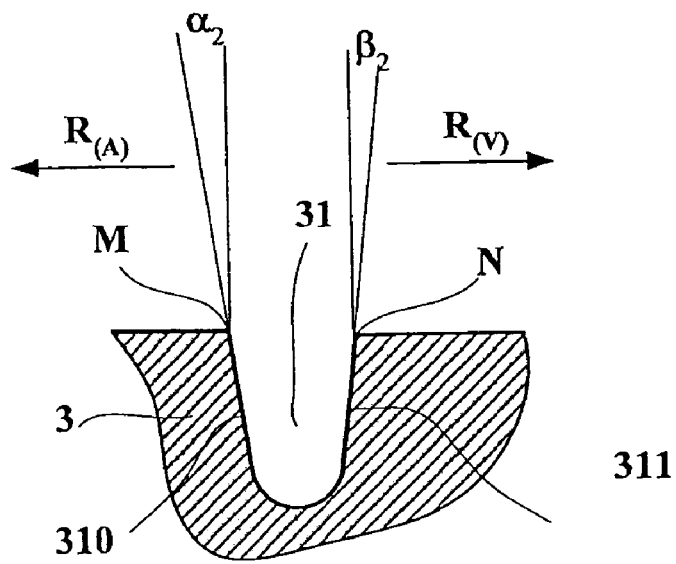
FIG. 2 shows a sectional view along the line II-II, of the pattern shown in FIG. 1.
Figure 3:
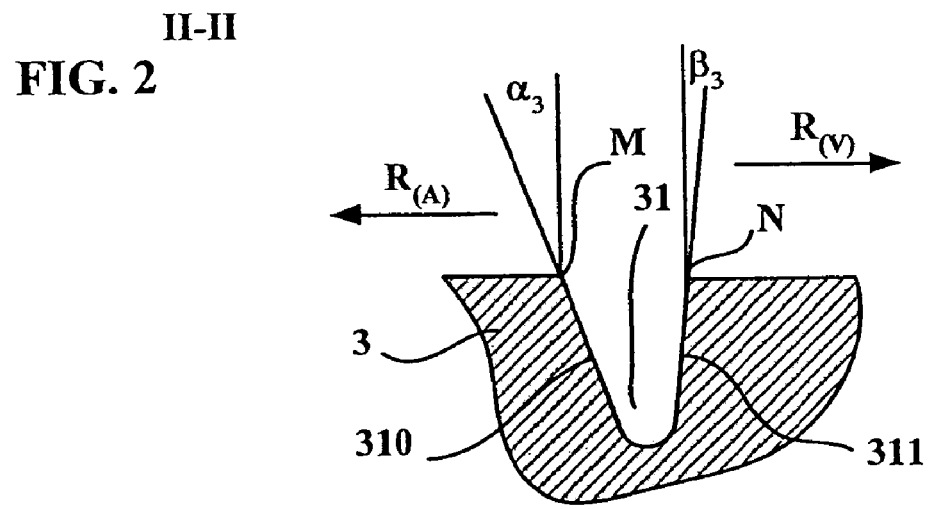
FIG. 3 shows a sectional view along the line III-III, of the pattern shown in FIG. 1.

Referring to FIG. 2 which shows a section along the line II-II of this tread at the level of an edge, and to FIG. 3 which shows another section along the line III-III taken axially outside the section along II-II, it can be seen that the faces 310 and 311 opposite one another that delimit transverse grooves 31 of the edge B make, relative to a perpendicular to the rolling surface, angles $\alpha 2$, $\beta 2$, $\alpha 3$, $\beta 3$, which are different in each of said section planes. The differences between these angles $(\alpha 2 - \beta 2)$ and $(\alpha 3 - \beta 3)$ are respectively equal to 5° and 16°.

It can be seen that proceeding axially towards the outside of the tread, the inclination difference between the opposite faces increases.

As a function of the use of this tire, i.e. depending on whether it is used for type-A or type-V work as defined earlier, a preferred rotation direction is determined for the tire, which therefore corresponds to a fitting direction onto the driving axle on the vehicle.

If the tire's use is type-A, i.e. the vehicle rolls under full load up an ascending slope and returns along the same path, the tire with the pattern described above is fitted so that the face 310, which makes an angle α1 on the section along II-II, is a trailing face (the corner formed by this face and the rolling surface marked in FIG. 2 by the letter M is last to break ground contact). In this case the rolling direction is indicated by the arrow R(A) directed from point N towards point M.

If the tire's use is type-V, i.e. the vehicle rolls under full load and with a braking torque on a descending slope and moves back up the same slope when empty, the tire should be fitted the other way round from the way used in type-A above. Consequently, for type-V use the rolling direction is that indicated by the arrow R(V) directed from the point M towards the point N.

Figure 4:
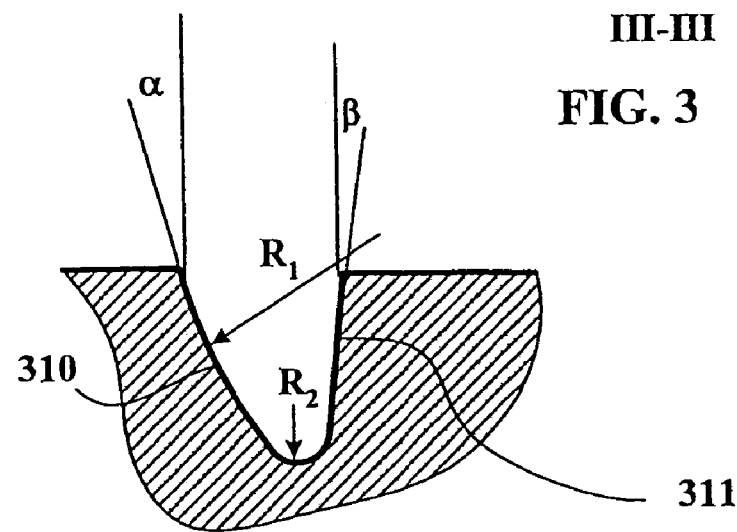
FIG. 4 shows a sectional view of another variant according to the invention, in which the angle of a face of a relief element at the edge increases with depth.

In another variant at least one face 310 (or 311) has an inclination which is not constant whatever the position in the thickness of the tread may be. For example, FIG. 4 shows a section at the edge of a tread in which the face 310 has a cylindrical shape with a first radius R1 of the rolling surface in the new condition followed by another cylindrical shape with a second radius R2, this latter radius being substantially smaller than R1. Thus, the angle α of the face 310 with a perpendicular to the rolling surface increases progressively with the position in the thickness of the tread. This arrangement is particularly advantageous since it enables the inclination difference between the faces 310 and 311 opposite one another to be increased as the tread becomes progressively more worn, and so to increase the wear gain. Preferably, the initial angle α of the face 310 close to the rolling surface in the new condition is larger than the angle β of the opposite face.

Besides, the tires according to the invention can advantageously comprise means for marking a preferred rotation direction in accordance with the main type of use of the vehicle to which they are fitted (either type A, ascending under load with a driving torque and descending empty with a braking torque, or type V, ascending empty and descending under load with a braking torque).

Of course, the invention is not limited to the examples described and illustrated, and various modifications thereto can be made without deviating from its scope.

What is claimed is:

1. A method for fitting tires to driving axles of a vehicle carrying heavy loads on one of type A route where the vehicle ascends under load with a driving torque and descends empty with braking torque and type V route where the vehicle ascends empty and descends under load with a braking torque, said method comprising:
   choosing tires for said vehicle, these tires having a tread of a maximum width L and an outer surface forming a rolling surface the tread comprising:
      a median portion having a width between 20 and 50% of the width L of the tread; and
      edge portions on axial sides of the median portion, the edge portions each comprising a plurality of relief elements defining a plurality of first transverse grooves extending transversely to a circumferential direction of the tire, each of the first transverse grooves being delimited by a first and a second rubber face, the first rubber face being inclined relatively to a median plane perpendicular to the rolling surface with an angle α different from an angle of inclination β of the second rubber face relative to the median plane;
   determining a type A route or a type V route to be taken by said vehicle;
   when the route is of type A, fining the tires to the driving axles such that for each of the first transverse grooves in the edge portions of the tread, one of the rubber faces has a smaller angle of inclination and comes into ground contact before the other one of the rubber faces does; and
   when the route is of type V, fitting the tires to the driving axles such that for each of the first transverse grooves in the edge portions of the tread, one of the rubber faces has a larger angle of inclination and comes into ground contact before the other one of the rubber faces does.

2. The method according to claim 1, wherein the median portion is provided with a plurality of second grooves, which substantially transverse an axial direction of the tire and are each delimited by rubber faces.

3. A tire for a vehicle carrying heavy loads, a main type of vehicle use being one of a type A where the vehicle ascends under load with a driving torque and descends empty with a braking torque, and a type V where the vehicle ascends empty and descends under load with a braking torque, said tire comprising:
   a tread having a maximum width L and an outer surface constituting a rolling surface, said tread comprising:
      a median portion having a width between 20% and 50% of the width L of the tread, and
      edge portions located on axial sides of the median portion and each comprising a plurality of relief elements defining a plurality of first transverse grooves, each of the first transverse grooves being delimited by first and second rubber faces opposite to each other, wherein the first and second rubber faces are inclined relatively to a median plane perpendicular to the rolling surface at different angles of inclination, and
   a marking element identifying a preferred tire rotation direction as a function of the main type of the vehicle use,
   wherein the median portion of the tread is provided with a plurality of second transverse grooves each delimited by first and second rubber faces whose inclination difference relative to the median plane perpendicular to the rolling surface is smaller than an inclination difference between the first and second rubber faces that delimit each of the first transverse grooves at the edge portions; and
   wherein the inclination difference between the first and second rubber faces delimiting the first transverse grooves is larger when the tread is half-worn than when it is new.

4. The tire according to claim 3, wherein said tire is fitted on a driving axle of said vehicle.

* * * * *